US012219297B2

(12) United States Patent
Hume et al.

(10) Patent No.: US 12,219,297 B2
(45) Date of Patent: Feb. 4, 2025

(54) IMAGE PROCESSING SYSTEM AND METHOD

(71) Applicant: Sony Interactive Entertainment Inc., Tokyo (JP)

(72) Inventors: Oliver Hume, London (GB); Fabio Cappello, London (GB); Timothy Bradley, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 134 days.

(21) Appl. No.: 17/690,588

(22) Filed: Mar. 9, 2022

(65) Prior Publication Data

US 2022/0303514 A1 Sep. 22, 2022

(30) Foreign Application Priority Data

Mar. 19, 2021 (GB) ...................................... 2103825

(51) Int. Cl.
*H04N 9/64* (2023.01)
*G06T 7/174* (2017.01)
(Continued)

(52) U.S. Cl.
CPC ............. *H04N 9/643* (2013.01); *G06T 7/174* (2017.01); *G06T 7/90* (2017.01); *G06V 10/22* (2022.01); *G06V 10/56* (2022.01); *G06V 10/70* (2022.01); *G06V 40/15* (2022.01); *G06V 40/16* (2022.01); *G06T 2207/10016* (2013.01); *G06T 2207/10024* (2013.01); *G06T 2207/20081* (2013.01);
(Continued)

(58) Field of Classification Search
CPC .............. A61B 5/02416; A61B 5/0816; A61B 2576/00; A61B 5/024; A61B 5/02405; A61B 5/021; A61B 5/0205; A61B 5/02055
See application file for complete search history.

(56) References Cited

U.S. PATENT DOCUMENTS

2014/0161421 A1   6/2014  Shoemaker
2017/0238842 A1*  8/2017  Jacquel ................ A61B 5/0077
(Continued)

OTHER PUBLICATIONS

Shamsabadi AS, Sanchez-Matilla R, Cavallaro A. Colorfool: Semantic adversarial colorization. InProceedings of the IEEE/CVF Conference on Computer Vision and Pattern Recognition 2020 (pp. 1151-1160). (Year: 2020).*

(Continued)

*Primary Examiner* — Clifford Hilaire
(74) *Attorney, Agent, or Firm* — Kilpatrick Townsend & Stockton LLP

(57) ABSTRACT

An image processing system for modifying one or more images of a user to change a cardiovascular activity that is measurable from the one or more images, the system comprising: an image receiving section configured to receive image data comprising a plurality of image frames; a region selection section configured to select one or more regions where the colour of the skin of the user changes temporally in the image data, wherein the colour changes are indicative of the cardiovascular activity of the user; and a modifying section configured to modify the colour change of the one or more selected regions in one or more image frames to create modified image data, as described elsewhere herein.

14 Claims, 2 Drawing Sheets

Figure 1:
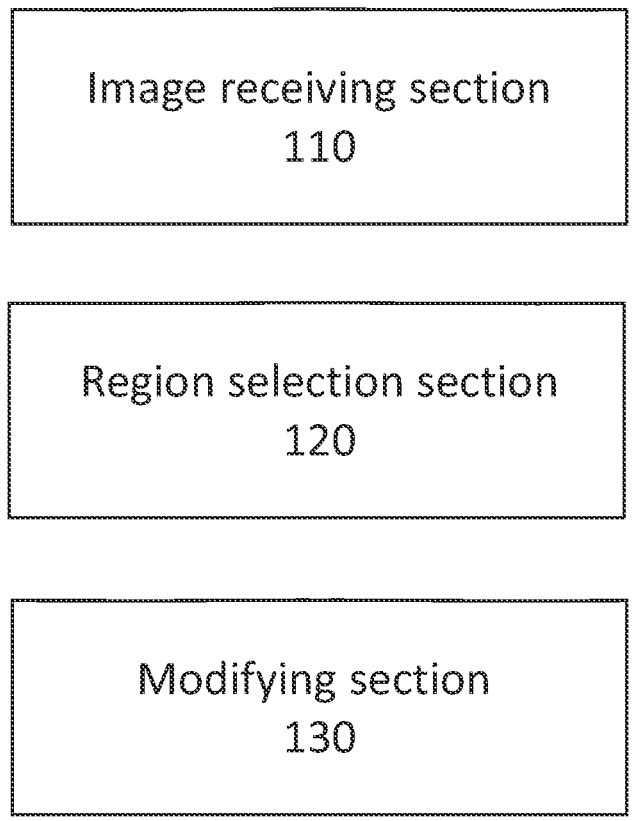

(51) Int. Cl.
  *G06T 7/90* (2017.01)
  *G06V 10/22* (2022.01)
  *G06V 10/56* (2022.01)
  *G06V 10/70* (2022.01)
  *G06V 40/10* (2022.01)
  *G06V 40/16* (2022.01)

(52) U.S. Cl.
  CPC .............. *G06T 2207/20092* (2013.01); *G06T 2207/30201* (2013.01)

(56) References Cited

U.S. PATENT DOCUMENTS

| | | | |
|---|---|---|---|
| 2019/0012531 A1* | 1/2019 | Radwin | G06T 7/251 |
| 2019/0046056 A1* | 2/2019 | Khachaturian | A61B 5/0816 |
| 2019/0197368 A1* | 6/2019 | Madani | G16H 30/40 |

OTHER PUBLICATIONS

Extended European Search Report for corresponding EP Application No. 22157063.3, 11 pages, dated Jul. 5, 2022.
Combined search and examination report for corresponding GB Application No. GB2103825.2, 13 pages, dated Jan. 6, 2022.
Tsou Yun-Yun, et al., "Multi-task Learning for Simultaneous Video Generation and Remote Photoplethysmography Estimation" 15th Asian Conference on Computer Vision, vol. 12626, 16 pages, Nov. 30-Dec. 4, 2020.
Communication Pursuant to Article 94(3)EPC for corresponding EP Application No. 22157063.3, 5 pages, dated Mar. 7, 2024.

* cited by examiner

IMAGE PROCESSING SYSTEM AND METHOD

FIELD OF INVENTION

The present invention relates to an image processing system and method.

BACKGROUND

Techniques for measuring a user's cardiovascular activity have been developed that are based upon the principle that, as human skin is translucent, light may penetrate through the skin. This light may then be reflected by subdermal elements, such as blood vessels, and then re-emitted through the user's skin. Changes in this re-emitted light are dependent on the changes of the blood flow beneath the skin, and as such identified changes in the re-emitted light can be used to infer information about the user's blood flow and therefore more general cardiovascular activity.

Previously, based on this relationship between the re-emitted light from an individual's skin and their cardiovascular activity, photo-plethysmography has become a widely used technology. Photo-plethysmography uses an LED to illuminate the skin, with the quantity of transmitted/reflected light being monitored to identify cardiac cycles (which, over time, indicates a heart rate of the user) or other characteristics of the user's cardiac activity. Photo-plethysmography has been commonly used in devices such as fitness bands, which are particularly suited for such an implementation as this technology requires attaching a dedicated light source and optical sensor to a part of a user's body, typically a finger or wrist, to measure their cardiovascular activity.

In recent years however, as the requirement in photo-plethysmography of having specialised equipment in contact with a user's skin can be somewhat limiting, techniques have been developed that are capable of extracting a user's cardiovascular activity based on video images of the user. One such example of this is transdermal optical imaging (TOI), which operates based upon a series of images of exposed portions of the user's skin.

TOI has been developed to use images captured by widely-available digital cameras, such as the camera of a smart-phone, to detect the small colour variations of a user's skin. These colour changes are indicative of the blood flow beneath the skin of the user, and therefore analysis of these images can enable measurement the user's cardiovascular activity.

One method for performing TOI uses machine learning to detect the regions in video images where the colour signal from the re-emitted light indicate concentrations of haemoglobin, as haemoglobin concentrations have distinct colour signatures based on the colour of the light re-emitted. Independent component analysis may then be used on these detected regions to extract the user's cardiovascular information.

Meanwhile, driven at least in part by the global pandemic caused by SARS-CoV-2, there has been an increase in the use of audio-video communication for both professional and recreational purposes. When in-person communication is impractical or infeasible, audio-video communication provides a more engaging method of communication in comparison to audio communication alone. This increase in the use of video communication therefore offers an increased opportunity for monitoring of a user's cardiovascular activity using TOI techniques.

It is in this context that the present disclosure arises.

SUMMARY OF THE INVENTION

In a first aspect, an image processing system is provided in claim 1.

In another aspect, an image processing method is provided in claim 14.

Further respective aspects and features of the invention are defined in the appended claims.

Figure 2:
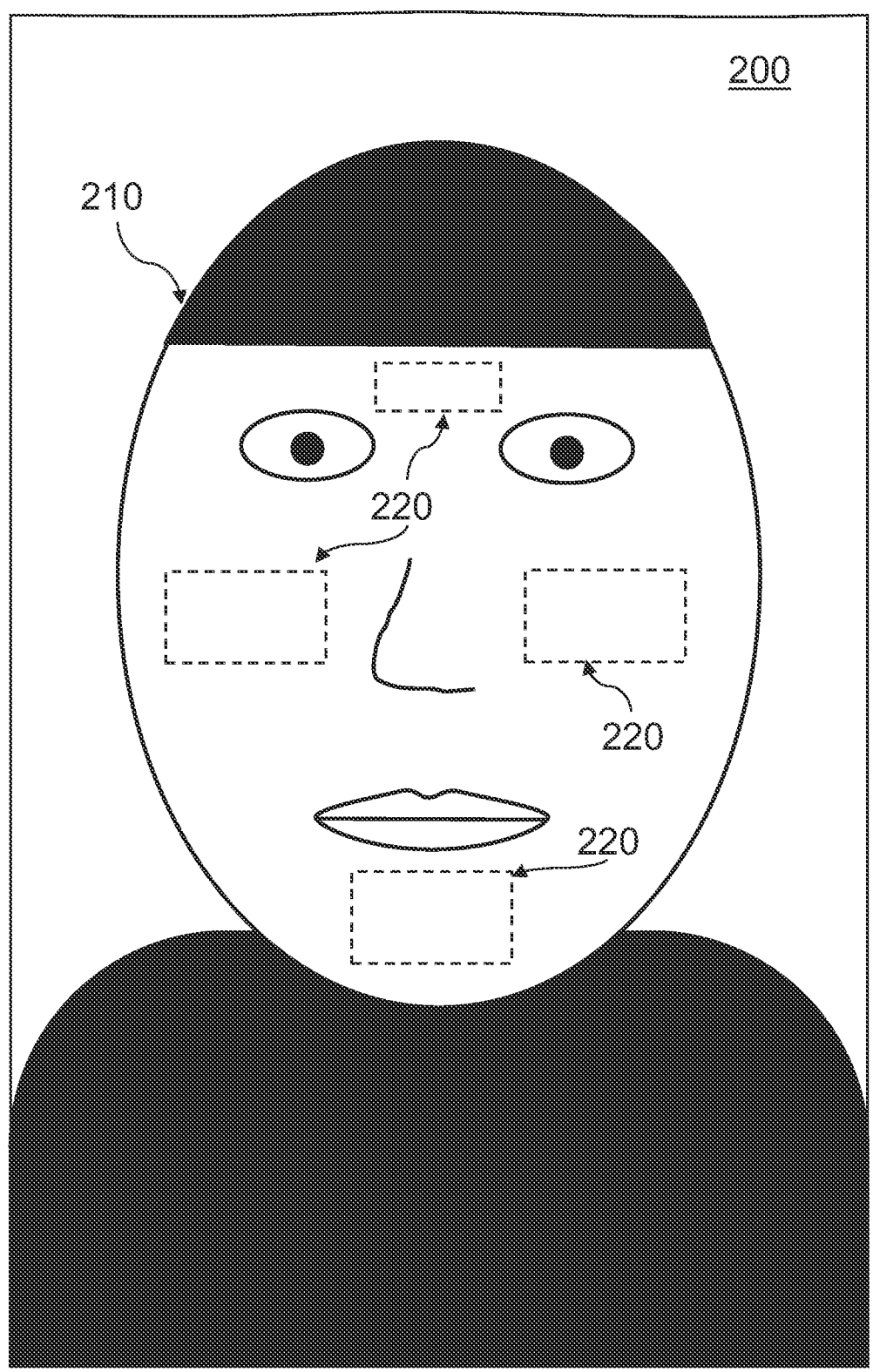

Embodiments of the present invention will now be described by way of example with reference to the accompanying drawings, in which:

FIG. 1 schematically illustrates an image processing system;

FIG. 2 schematically illustrates an example of a frame of image data; and

Figure 3:
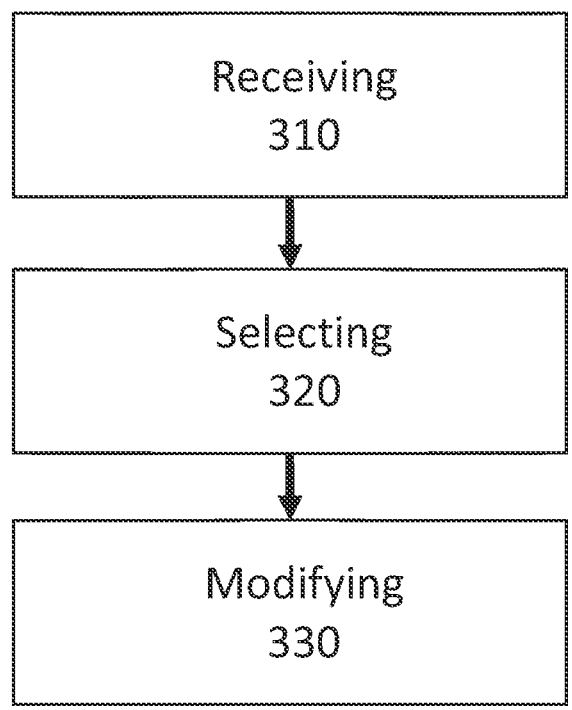

FIG. 3 schematically illustrates an example image processing method.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

With the rise in the use of video communication alongside the development of transdermal optical imaging (TOI) techniques, users of video communication tools may unwillingly (and/or unknowingly) have their cardiovascular activity monitored. This monitoring could be performed by a video communication platform to gather data on that platform's users, or by a device used by participant in an ongoing video call.

For example, a company may interview prospective candidates to hire for a job opening. The company may decide to use TOI to monitor a prospective candidate's cardiovascular activity, potentially without the consent or knowledge of the prospective candidate. The company could then examine the prospective candidate's cardiovascular activity to identify the candidate's level of stress or nervousness during the interview.

This may be a large privacy concern for users of video communication; it is may therefore be considered desirable to address or mitigate this problem. Therefore, it is desirable to provide an image processing system that can modify captured image data so as to obscure the biomarker signals of a user in image data that can be used for TOI, such as the temporal pattern of the colour change of the user's exposed skin. Additionally, it may also be desirable to provide an image processing system can modify captured image data so as to cause detected biomarker signals to indicate a predetermined cardiovascular activity.

Accordingly, turning now to FIG. 1, in some embodiments of the present disclosure, an image processing system for modifying one or more images of a user to change a cardiovascular activity measurable from the one or more images, the device comprises an image receiving section 110 configured to receive image data comprising a plurality of image frames; a region selection section 120 configured to select one or more regions where the colour of the skin of the user changes temporally in the image data, wherein the colour changes are indicative of the cardiovascular activity of the user; and a modifying section 130 configured to modify the colour change of the one or more selected regions in one or more image frames to create modified image data.

The image receiving section 110 may receive image data that are being captured live, such as a live video call, or image data that have been captured previously, such as a pre-recorded lecture or instructional video, in order to modify the image data prior to the image data being shared for example.

FIG. 2 illustrates an example image frame 200 that comprises an image of a user 210. The region selection section 120 may select one or more regions 220 where the colour of the skin of the user changes temporally in the image data, wherein the colour changes are indicative of the cardiovascular activity of the user. It will be noted that the regions 220 shown in FIG. 2 are only a selection of exemplary regions in which the colour of the skin of the user may change temporally. In some embodiments, the selected regions may vary in number such that there may be more or fewer regions, and these regions may be located in other positions.

Furthermore, whilst FIG. 2 shows an image of the user where only the skin of the user's face is visible in the image data, the image data may alternatively, or additionally, comprise images of the user's hand or chest (or indeed any other area) where the skin of the user is visible for example. Therefore, the region selection section may select one or more regions where the colour of the skin of the user changes temporally in image data of the user's hand or chest where corresponding parts of the skin of the user is visible, either instead of or in addition to selecting regions of the user's face.

In some embodiments of present disclosure, the one or more selected regions where the colour of the skin of the user changes temporally in the image data may be one or more predetermined regions. These predetermined regions may be monitored/modified specifically, rather than (or in addition to) performing a continuous detection process to identify which regions should be subjected to image processing techniques in accordance with embodiments of the present disclosure. The predetermined regions may be determined using any suitable process, including any one or more of those described below.

One or more of the predetermined regions may be selected using a calibration process that is performed upon start-up, or during a user's first use of the system (for example). This calibration may use TOI techniques to pre-determine one or more regions of the user's exposed skin that may be used to detect the user's cardiovascular activity, and the location of the one or more predetermined regions on the user's exposed skin may be stored as a part of a user profile. Suitable regions detected in this manner may be those that demonstrate an above-threshold magnitude or frequency of biomarker signals, for example, and/or biomarker signals associated with particular cardiovascular activity.

The region selection section 120 may then select one or more regions by detecting one or more locations where the skin of the user is visible in the image data, and selecting one or more of those locations that correspond to the predetermined regions as identified in the user's profile.

As another example, the one or more predetermined regions may be selected by a user prior to, or whilst, using the image processing system.

Additionally, the one or more predetermined regions may be generated by a plurality of users and provided to a server or a central database so as to provide a library of one or more predetermined regions that may be used for TOI techniques. Similarly, developers may indicate one or more regions in such a library rather than relying upon user uploads (or only user uploads). In some examples, rather than a library comprising a number of different user's predetermined regions it may be considered advantageous to generate a number of representative predetermined regions by averaging or otherwise combining different users' predetermined regions. These averages or combinations may be generated in any suitable fashion for generating an improved dataset for use by specific users or groups of users.

This library may be used in place of a user profile in identifying predetermined regions, or it may be used as a source of data from which the user profile can be updated—for instance, a selection of predetermined regions may be added to a user profile in dependence upon suitability for that user.

Suitability may vary in dependence upon a number of factors, such as common peripherals used (for instance, a user of a full-immersion HMD may not have a visible forehead) and/or demographic information such as age (for instance, older users may require different predetermined regions if wrinkles impact detection of biomarker signals).

Such embodiments are examples of embodiments in which the region selection section 120 is configured to select one or more regions in accordance with predetermined regions in which colour changes are likely to be observed. That is to say that rather than selecting regions in which colour changes are observed, regions may be selected based upon an expected or likely observation of colour changes over time.

In some embodiments of the present disclosure, the region selection section may compare the colour changes between the temporally adjacent frames in order to select one or more regions 220 where the colour of the skin of the user changes temporally in the image data. Such a process may be performed in an initial stages of the image modification process, effectively as a live calibration, or may be performed throughout the image modification process. This is therefore an alternative (or additional) approach to that of the use of predetermined regions.

In some embodiments, the region selection section 120 may compare a predetermined number of frames corresponding to a period of time to select one or more regions 220 where the colour of the skin of the user changes temporally in the image data. For example, thirty frames would correspond to one second if the image data are recorded at thirty frames per second. These frames may be compared to one another (effectively a monitoring performed for a fixed amount of time), or the average of the frames may be compared to the average of another set of frames corresponding to a different time period of the same duration to identify changes. Any other suitable comparisons to identify a change in colour over time may also be considered.

In some embodiments, the region selection section 120 may instead sample every other frame in order to reduce the processing requirements relative to considering every frame for a particular time period (for instance, sampling fifteen frames a second in a thirty frames per second embodiment). Sampling every other frame is provided only as one example of the number of frames that may be sampled. For example the region selection section may sample two frames out of three. Any other appropriate sampling scheme may be considered—for example, based upon user preference or technological considerations.

In some embodiments of the present disclosure, the region selection section 120 may select one or more regions where the colour of the skin of the user changes temporally within a predetermined number of frames. For example, if the image data is configured at thirty frames per second, the region selection section may select one or more regions where the colour of the skin of the user changes in a thirty frame period, which would correspond to one second, or fifteen frames, which would correspond to half a second. These numbers are provided as an example and other appropriate numbers of frame may be used. Additionally, the image data may be configured for other frame rates, such as sixty frames per second for example, with the selected number of frames being modified in a corresponding fashion.

Optionally, the region selection section 120 may select one or more regions where the colour of the skin of the user changes temporally relative to a temporal colour change averaged across all of the skin (or a portion thereof, such as the face) of the user visible in the image data. That is to say that an average colour change for the identified skin may be omitted when identifying colour changes for individual regions of the user's skin. This may allow the region selection section to differentiate between temporal colour changes that may occur from changes in illumination and temporal colour changes that are indicative of the user's cardiovascular activity. Advantageously this can lead to a more reliable determination of appropriate regions, as a selection of a region based upon observed colour changes indicative of environmental lighting changes may be avoided in many cases.

In some embodiments of the present disclosure, the modifying section 130 may modify the colour change of the one or more selected regions in one or more image frames by modifying the colour value of one or more of the pixels in each of one or more of the regions.

Here, the phrase 'modify the colour change' is considered to refer to the performing of process that causes a detected colour change (as detected from a comparison of a plurality of image frames) to be different in the modified images to that which would be detected from the captured (that is, unmodified) images. As noted above, the modification may be implemented on a per-region and/or per-pixel basis as appropriate. Any appropriate colour space may be used, for example RGB or YUV.

For example, for each region in an image frame, the modifying section may shift the colour value of the pixels in a colour space towards the colour value of the pixels in the corresponding region in a reference image frame. That is to say that the colour value of pixels may be modified so as to decrease the difference between the colour values of corresponding pixels (or pixel regions) is reduced between an image frame and the reference image frame.

The reference image frame may be the immediately preceding image frame, for example. Alternatively, in order to reduce processor load, the reference image frame used as the colour reference for the modification of an image frame may not be the immediately preceding image frame. Instead, a single image frame (say, image frame n) may be used as a reference image frame for two or more following image frames (n+1, n+2, for example). This can reduce the frequency with which a colour reference is updated, thereby reducing the amount of processing.

For example, consider a set of frames of image data where the second image frame is the first frame to be modified. The modifying section may use the immediately preceding frame (the first image frame) as the reference image frame for modifying the second image frame. After modifying the second image frame, the third image frame is the next frame to be modified by the modifying section, and the modifying section may also use the first image frame as the reference image frame for modifying the third frame. The modifying section may then continue to use the first image frame as the reference image frame for modifying later image frames until a predetermined number of image frames have been modified with the first image frame as the reference image frame. After the predetermined number of image frames have been modified, another image frame may then be selected as the reference image frame.

Considering the above example in a case where the modifying section uses the same image frame as the reference image frame for modifying five image frames, the modifying section will use the first image frame as the reference image frame up to and including the modification of the sixth image frame. However, when the modifying section modifies the seventh image frame, the modifying section will use the image frame immediately preceding the seventh image frame as the reference image frame; in this case, the sixth image frame. The modifying section will then continue to use the sixth image frame as the reference image frame for the modification next four image frames (the eighth image frame to the eleventh image frame) before another frame is selected as the reference image frame.

Whilst an example where the immediately preceding frame is selected as the reference image frame when selecting another reference image frame has been discussed above, any appropriate separation between the image frame to be modified and the reference image frame may be used. For example, the separation may be five image frames when the reference image frame is selected (i e image frame two could be selected as the reference image frame for the modification of the seventh image frame).

In some embodiments, the predetermined number of frames may be selected based on the cardiovascular activity that is desired to be indicated in the modified image data, and/or based upon the cardiovascular activity that is desired to be concealed. For instance, if a user wishes to indicate that they are calm then the predetermined number of frames may be increased as the amount of cardiovascular activity (and therefore colour change activity) would be expected to be lower. However, in the alternative case in which a user wishes to appear angry then the number of predetermined frames may be lowered in accordance with the increased cardiovascular that would be expected to be indicated. The same considerations may also apply when selected a predetermined number of frames based upon the cardiovascular activity that is being concealed.

In some embodiments, the modifying section 130 may use a modified version of an image frame that has already been modified by the modifying section as the reference image frame. Alternatively, the modifying section may use an unmodified version of an image frame for modifying subsequent frames, even when a modified version of the image frame has been output in the modified image data.

There are several options for determining the change of the colour value that is to be applied to pixels in an image frame so as to reduce the colour difference between the image frame and the reference image frame. As noted above, this may be performed on a per-pixel, per-region, and/or per-image basis as appropriate.

For example, the determined change may be proportional to the difference between an average of the colour value of the pixels in a region of the image frame to be modified and an average of the colour value of the pixels in the corresponding region of the reference image frame. For example, the determined colour change may be a percentage of the identified difference in averages. Therefore, when the difference between these two average colour values is large, the determined change will also be large, and when the difference between the two colour values is small, the determined change will also be small.

As another example, the determined change may be chosen so that the average colour value of the pixels in the region of the modified image frame is an average of the colour value of the pixels in both the region of the image frame to be modified and the corresponding region of the reference image frame.

The modifying section 130 may modify the colour change of the one or more selected regions in the one or more image frames in the image data to create modified image data in any of a variety of ways depending upon the desired result.

For example, in some embodiments of the present disclosure, the modifying section may modify the colour change of the one or more selected regions in the image data to create modified image data, in which a temporal pattern of the colour change of the one or more selected regions in the modified image data is indicative of a predetermined cardiovascular activity representative of a cardiovascular activity of a human. As an example, the temporal pattern may be predetermined based on a database of temporal patterns of the colour change of one or more regions in unmodified image data of a plurality of different users. The temporal pattern may also be determined based on previously captured image data of the user, for example.

If TOI techniques are then used on this modified image data, the TOI techniques would generate results that show a predetermined cardiovascular activity, but the predetermined cardiovascular activity may not be the actual cardiovascular activity of the user in the image data. This type of modification to the image data could advantageously allow a user to not only protect their privacy, but also allow the user to display a cardiovascular activity of their choice. For example, the user may select a predetermined cardiovascular activity corresponding to a relaxed person, and that would result in the generation of an image that would be identified by TOI techniques as showing the user being relaxed.

Alternatively, the modifying section may modify the colour change of the one or more selected regions in the image data to create modified image data where the temporal pattern of the colour change of the one or more selected regions in the modified image data is not indicative of any particular cardiovascular activity. This type of modification to the image data could reduce the information about the user that is able to be obtained using TOI techniques on the modified image data; for instance, concealing the emotional state of the user.

Optionally, the modifying section 130 may modify the colour of the one or more regions by randomly perturbing the colour value within a predetermined range for each region in each image frame in the plurality of image frames. The predetermined range may be selected based on the range of colour variation in the one or more regions within a set time period, for example, or may be defined as a variable based upon human perception of the colour changes. The perturbation of the colour may be small enough to be imperceptible to a human view whilst also preventing TOI techniques from determining the cardiovascular activity of the user.

In some embodiments of the present disclosure, the modifying section 130 may modify the average colour change of the pixels in each of the one or more selected regions to a rolling average of the colour of each respective pixel in the region over a predetermined number of frames. For example, this rolling average would smooth the temporal pattern of the colour change for each of the one or more selected regions. Therefore, TOI may be unable to accurately measure the cardiovascular activity of the user, as the level of detail of the temporal pattern of the colour change would be reduced.

Optionally, the temporal pattern of the colour change may be selected by the user. For example, the user may select a temporal pattern of the colour change from a list of potential temporal patterns of the colour change. The list of temporal patterns of the colour change may include, for example, temporal patterns that are indicative of a desired cardiovascular activity, which may be based on previously captured image data of the user; and one or more temporal patterns that are similar to a temporal pattern of one or more other participants in a video call. Therefore, a user could select an option that would cause the image processing system to generate modified image data in which the cardiovascular activity measurable from the image data could mimic a cardiovascular activity of another participant in a video call.

Allowing a user to select the temporal pattern of the colour change could advantageously enable a user to be able to choose between whether, and which, predetermined cardiovascular activity may be measured from the modified image data using TOI.

In some embodiments of the present disclosure, the operation of the modifying section 130 (and/or the region selection section 120) may be activated in response to one or more predetermined trigger conditions. For example, the predetermined trigger condition may be based upon an input provided by a user; a detection of one or more temporal patterns of the colour change in the image data that may indicate a certain cardiovascular activity of the user; or a change in the number of one or more regions selected by the region selection section.

For example, if a temporal pattern of the colour change that indicates that the user may stressed or nervous is detected, the modifying section 130 may be activated to disguise this temporal pattern of the colour change. This activation may be for a predetermined period of time, until the end of the video call (or recording), or until the detected pattern has returned to a preferred state (such as indicating that the user is calm), or indeed any other period.

While the discussion above has focused on an embodiment in which each image frame is modified, it is also considered that only a subset of the image frames may be modified to achieve a desired effect. For instance, a user's cardiovascular could be sufficiently concealed by modifying only every other image frame (or any other distribution of frames) as this may prevent the colour change from being measured as corresponding to a particular pattern. That is to say that not every image frame must have a modified colour change in order for a cardiovascular activity to be obscured from TOI methods.

In some embodiments of the present disclosure, the colour change applied by the modifying section 130 may be determined by a machine learning model. In such embodiments, it is considered that the machine learning model is trained to modify the image data in order to control a measurement of the cardiovascular activity of the user by an imaging system configured to detect the cardiovascular activity of the user indicated in the image data.

While a number of different methods of training machine learning models may be appropriate for implementing embodiments of the present disclosure, it is considered that an adversarial approach may be particularly appropriate in a number of cases. As noted above, TOI techniques typically use a trained machine learning model to measure a user's cardiovascular activity from image data comprising image frames of the user; an aim of the present disclosure may therefore be considered to be causing such a model to generate an incorrect output for a captured image by applying an appropriate modification.

In some embodiments, a generative adversarial network (GAN) may be utilised in which a generative network is trained to generate outputs (from input images) that generate particular results when provided to one or more existing TOI models (which serve as the adversarial model in the GAN). These particular results may be a desired classification (such as 'relaxed') or a failure to classify, for instance. Based upon the success or failure of particular modifications, the generative model may be refined as appropriate.

The machine learning model may be trained based on a database of image data for a plurality of users, or a database of image data for an individual user. Additionally, preliminary training may be based on a database of image data for a plurality of users and the model may then be further calibrated for a user based on images of the user. The calibration may require specific camera angles or lighting when capturing images of the user, although in some embodiments this may not be necessary.

Alternatively, in some embodiments of the present disclosure, an adversarial machine learning model may be used to modify the image data in order to control the result generated by the TOI machine learning model. It will be appreciated that any appropriate adversarial learning model may be used. For example, fast gradient sign or projected gradient descent.

In some embodiments of the present disclosure, the machine learning model may modify the image so that TOI techniques cannot extract a user's cardiovascular activity from the image data. However, in other embodiments of the present disclosure, the machine learning model may be trained to generate a modification to the image data to cause the measurement of the cardiovascular activity of the user, generated by the imaging system configured to detect the cardiovascular activity of the user indicated in the image data, to a predetermined cardiovascular activity.

Therefore, a user will not only be able to disguise their cardiovascular activity, but also be able to modify the image data to show a different cardiovascular activity, when TOI is used to measure the user's cardiovascular activity from the modified image data.

In some embodiments, it is considered that varying light levels and/or colours within the environment may have an effect on the TOI process. It may therefore be advantageous in some embodiments to perform a calibration process, either initially during a setup process or as an ongoing process alongside the image modification process, so as to determine the light levels within the environment and any fluctuations that may occur. In such a calibration, image processing techniques may be performed to identify a colour change that effects the whole of the captured image, or a particular region of the image (such as the user's face) that may be indicative of an environmental lighting change.

In some embodiments, a user may be wearing an HMD or the like (for instance, headphones or a microphone) that can be provided with an indicator light or a predetermined marker. This light or marker may be used as a reference for such a calibration, as the appearance of these elements would be expected to be both known and constant over time; in addition to this, such elements may also be located close to the user's face and so provide useful information. In some embodiments it is therefore considered that the image modification system comprises a wearable component that comprises a predetermined marker and/or a light source.

In some embodiments of the present disclosure, a camera may comprise one or more components of the image processing system. Therefore, a user would be able to purchase a camera with the advantageous features of the image processing system of the present description. Therefore, image data of individuals captured by the camera would have increased privacy in comparison to image data of individuals captured with another camera that does not comprise the image processing system, irrespective of the video call platform that is used. Additionally, if a camera comprises the image processing system, it may reduce the processing load on the device operating the video call platform or prevent data collection by the video platform itself.

Turning now to FIG. 3, in some embodiments of the present disclosure, an image processing method is provided, the method comprising the steps of: receiving 310 image data comprising a plurality of image frames; selecting 320 one or more regions where the colour of the skin of the user changes temporally in the image data, wherein the colour changes are indicative of the cardiovascular activity of the user; and modifying 330 the colour change of the one or more selected regions in the one or more image frames to create modified image data.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be configured in accordance with one or more of the following numbered clauses:

1. An image processing system for modifying one or more images of a user to change a cardiovascular activity that is measurable from the one or more images, the system comprising:
    an image receiving section configured to receive image data comprising a plurality of image frames;
    a region selection section configured to select one or more regions where the colour of the skin of the user changes temporally in the image data, wherein the colour changes are indicative of the cardiovascular activity of the user; and
    a modifying section configured to modify the colour change of the one or more selected regions in one or more image frames to create modified image data.
2. The image processing system of clause 1, wherein the modifying section is configured to modify the colour change such that the modified image data is indicative of a predetermined cardiovascular activity representative of a cardiovascular activity.

3. The image processing system of clause 1, wherein the modifying section is configured to modify the colour change such that the modified image data is not indicative of cardiovascular activity.

4. The image processing system of clause 3, in which the modifying section is configured to modify the colour of the one or more regions by randomly perturbing the colour value within a predetermined range for each image frame in the plurality of image frames.

5. The image processing system of clause 2 or 3, wherein a temporal pattern of the colour change is selected by the user.

6. The image processing system of clause 1, wherein the modifying section is configured to modify the colour change of each of the one or more selected regions to a rolling average of the colour of each respective region over a predetermined number of preceding image frames.

7. The image processing system of any one of the preceding clauses, wherein the modifying section is operable to apply a colour change generated by a machine learning model that is trained to control a measurement of the cardiovascular activity of the user, the measurement being generated by an imaging system configured to detect the cardiovascular activity of the user indicated in the image data.

8. The image processing system of clause 7, wherein the machine learning model is an adversarial machine learning model.

9. The image processing system of any preceding clause, wherein the region selection section is configured to select one or more regions in accordance with predetermined regions in which colour changes are likely to be observed.

10. The image processing system of any one of the preceding clauses, wherein the region selection section is configured to select one or more regions where the colour of the skin of the user changes temporally relative to a temporal colour change averaged across all of the skin of the user visible in the image data.

11. The image processing system of any one of the preceding clauses, wherein the region selection section is configured to select one or more regions where the colour of the skin of the user changes temporally over a predetermined number of frames.

12. A camera comprising the image processing system of any of the preceding clauses.

13. The image processing system of any one of the preceding clauses, wherein the modifying section is configured to be activated in response to a predetermined trigger condition.

14. An image processing method for modifying one or more images of a user to change a cardiovascular activity that is measurable from the one or more images, the method comprising the steps of:
receiving image data comprising a plurality of image frames;
selecting one or more regions where the colour of the skin of the user changes temporally in the image data, wherein the colour changes are indicative of the cardiovascular activity of the user; and
modifying the colour change of the one or more selected regions in the one or more image frames to create modified image data.

15. A computer program comprising computer executable instructions adapted to cause a computer system to perform the method of clause 14.

The invention claimed is:

1. An image processing system for modifying one or more images of a user to change a measurable cardiovascular activity that is measurable from the one or more images, the system comprising:
an image receiving section configured to receive image data comprising a plurality of image frames taken of the user;
a region selection section configured to select one or more regions where temporal changes in a colour of the user's skin are present in the image data of the image frames, wherein the temporal changes in the colour are indicative of the cardiovascular activity of the user; and
a modifying section configured to modify the temporal changes in the colour of the selected one or more regions in one or more of the image frames to create modified image data related to the one or more images of the user such that the modified image data is not indicative of the cardiovascular activity of the user.

2. The image processing system of claim 1, wherein the modifying section is configured to modify the temporal changes in the colour such that the modified image data is indicative of a predetermined cardiovascular activity representative of a cardiovascular activity.

3. The image processing system of claim 2, wherein a temporal pattern of the temporal changes in the colour is selected by the user.

4. The image processing system of claim 1, wherein the modifying section is configured to modify the temporal changes in the colour such that the modified image data is not indicative of cardiovascular activity.

5. The image processing system of claim 4, in which the modifying section is configured to modify the temporal changes in the colour of the selected one or more regions by randomly perturbing a colour value within a predetermined range for each image frame in the plurality of image frames.

6. The image processing system of claim 1, wherein the modifying section is configured to modify the temporal changes in the colour of each of the selected one or more regions to a rolling average of colour of each of the selected one or more regions over a predetermined number of preceding image frames.

7. The image processing system of claim 1, wherein the modifying section is operable to apply a colour change generated by a machine learning model that is trained to control a measurement of the cardiovascular activity of the user, the measurement being generated by an imaging system configured to detect the cardiovascular activity of the user indicated in the image data.

8. The image processing system of claim 7, wherein the machine learning model is an adversarial machine learning model.

9. The image processing system of claim 1, wherein the region selection section is configured to select the one or more regions where the temporal changes in the colour of the skin of the user relative to a temporal colour change averaged across all of the skin of the user are present in the image data.

10. The image processing system of claim 1, wherein the region selection section is configured to select the one or more regions where the temporal changes in the colour of the skin of the user are present over a predetermined number of frames.

11. A camera comprising the image processing system of claim 1.

12. The image processing system of claim 1, wherein the modifying section is configured to be activated in response to a predetermined trigger condition.

13. An image processing method for modifying one or more images of a user to change a measurable cardiovascular activity that is measurable from the one or more images, the method comprising the steps of:

receiving image data comprising a plurality of image frames taken of the user;

selecting one or more regions where temporal changes in a colour of the user's skin are present in the image data of the image frames, wherein the temporal changes in the colour are indicative of the cardiovascular activity of the user; and modifying the temporal changes in the colour of the selected one or more regions in one or more of the image frames to create modified image data related to the one or more images of the user such that the modified image data is not indicative of the cardiovascular activity of the user.

14. A non-transitory machine-readable storage medium which stores computer software which, when executed by a computer, causes the computer to perform a method for modifying one or more images of a user to change a measurable cardiovascular activity that is measurable from the one or more images, the method comprising the steps of:

receiving image data comprising a plurality of image frames taken of the user;

selecting one or more regions where temporal changes in a colour of the user's skin are present in the image data of the image frames, wherein the temporal changes in the colour are indicative of the cardiovascular activity of the user; and modifying the temporal changes in the colour of the selected one or more regions in one or more of the image frames to create modified image data related to the one or more images of the user such that the modified image data is not indicative of the cardiovascular activity of the user.

* * * * *